United States Patent
Blau et al.

(10) Patent No.: US 7,463,410 B2
(45) Date of Patent: Dec. 9, 2008

(54) OPTICAL FREQUENCY CONVERTER FOR NON-POLARIZED LIGHT

(75) Inventors: Pinhas Blau, Nof Ayalon (IL); Raphael Lavi, Raanana (IL); Shaul Pearl, Moshav Nehusha (IL); Ariel Elior, Modiin (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 205 days.

(21) Appl. No.: 10/564,630

(22) PCT Filed: Jul. 16, 2004

(86) PCT No.: PCT/IL2004/000647

§ 371 (c)(1),
(2), (4) Date: Jan. 13, 2006

(87) PCT Pub. No.: WO2005/008328

PCT Pub. Date: Jan. 27, 2005

(65) Prior Publication Data

US 2007/0201125 A1    Aug. 30, 2007

(51) Int. Cl.
*G02F 1/035* (2006.01)
*G02F 2/02* (2006.01)

(52) U.S. Cl. .................................... 359/330; 359/326

(58) Field of Classification Search .......... 359/326–332
See application file for complete search history.

(56) References Cited

U.S. PATENT DOCUMENTS

2002/0179912 A1 * 12/2002 Batchko et al. ............... 257/79

OTHER PUBLICATIONS

Webjörn et al. ("Efficient quasi-phase-matched frequency doubling of a high power, unpolarized fiber laser source", CLEO '98, 1998, p. 76).*
J. Webjorn et al., "Efficient quasi-phase-matched frequency doubling of a high power unpolarized fiber laser source", Technical Digest, Summaries of Papers Presented at the Conference on Lasers and Electro-Optics Conference Edition 1998 Technical Digest Series, vol. 6 (IEEE Cat. No. 98CH36178) Opt. Soc. America, Washington, DC, USA, May 5, 1998, p. 76, XP002297740, ISBN: 1-55752-339-0.
PCT Written Opinion for PCT/IL2004/000647.

* cited by examiner

*Primary Examiner*—M. R. Connelly-Cushwa
(74) *Attorney, Agent, or Firm*—Dekel Patent Ltd.; David Klein

(57) ABSTRACT

Optical apparatus including an optical frequency conversion device, pumped by a non-polarized light beam. The apparatus may include a pump incident side, such as an optical fiber emitting non-polarized light beam, a polarization beam splitter to split the incident beam into two polarized beams, beam forming optics to shape the beams and rotate their polarization as required and couple them into the conversion device, and an optical frequency conversion device to convert the wavelength of both beams into a new wavelength.

7 Claims, 1 Drawing Sheet

OPTICAL FREQUENCY CONVERTER FOR NON-POLARIZED LIGHT

FIELD OF THE INVENTION

The present invention relates to an optical frequency converter, wherein the pump laser source is a non-polarized laser source, such as a fiber optics laser oscillator or laser amplifier, and the frequency converter is a non-linear optical crystal, such as periodically poled lithium niobate, periodically poled potassium titanyl phosphate (KTP), periodically poled lithium tantalite, etc. Among the many applications of such a device is for a light source with a wavelength different from the pump laser wavelength.

BACKGROUND OF THE INVENTION

It is known in the art to convert the optical frequency (the wavelength) of a laser beam by means of non-linear interaction in an optical crystal.

A laser beam (pump beam) is focused into the non-linear crystal. If the peak power density of the pump beam is sufficiently high, and several conditions within the crystal are fulfilled (for example, adequate non-linearity, phase matching, optical transparency in the relevant wavelengths, etc.), a beam or beams at different wavelengths will be generated.

Various conversion processes are known. The pump laser beam(s) may be converted into shorter wavelength beam(s) in a second harmonics generation or sum frequency mixing processes. The beam(s) may be converted into longer wavelengths beams in a difference frequency mixing or optical parametric generation processes.

In an optical parametric oscillation process, a non-linear crystal is placed within a cavity, pumped at a single wavelength, thereby generating two new wavelengths.

Many non-linear crystals are known in the art. They differ from one other in their optical transmission range, in their non-linear coefficients, in their damage threshold etc. Phase matching between the interacting beams may be obtained, in bulk uniaxial crystals, by utilizing the birefringence of the crystal. Quasi phase matching may be obtained in several ferroelectric crystals by periodic poling of the non-linear crystal, or in a crystal that is grown in a periodically patterned orientation, with a period that compensates for the phase mismatching.

Both the non-linear interaction process and the phase matching condition are polarization sensitive. Hence, usually the conditions within the crystal for conversion of specific wavelength(s) into a different specific wavelength(s) are fulfilled only for a specific light polarization at a time. For this reason a polarized pump laser is used. The generated beams will also be polarized.

Solid-state lasers comprise a lasing crystal placed within a cavity, and a pump light source that excites the lasing crystal. Current solid-state lasers use diode lasers as a pump light source. Novel solid-state lasers use doped optical fibers as the lasing media. Erbium doped fiber amplifiers (EDFA) are used in the optical communication field for generating and amplifying light beams. Such fiber lasers are superior to bulk crystal lasers in their efficiency, rigidity, and plasticity.

Fiber laser systems may be set up to generate narrow line widths that are required for pumping a frequency converter. However, usually they generate non-polarized light. Fiber lasers are also limited in their peak power because of the damage threshold of the fiber.

Fiber laser pumped optical frequency conversion has been tried. Several methods have been utilized to get the polarized pump beam that is required for frequency conversion. It is possible to separate the two polarizations and convert each polarization by itself in a separate converter. Polarizations maintaining fibers or fiber bending configurations have been used to preferably enhance one polarization at the expense of the other. In all those methods, the peak power is less than that obtained from a non-polarized lasing configuration.

SUMMARY OF THE INVENTION

The present invention seeks to provide an optical frequency converter, wherein the pump laser source is a non-polarized laser source, such as a fiber optics laser oscillator or laser amplifier, and the frequency converter is a non-linear optical crystal. The non-linear optical crystal can be either bulk or periodically poled crystal, such as lithium niobate, potassium titanyl phosphate (KTP), lithium tantalite, barium borate etc. The present invention provides a configuration in which the optical frequency converter is pumped by a non-polarized laser beam, and both light polarizations are converted within the same converter.

In accordance with one non-limiting embodiment of the present invention, a method for optical frequency conversion may comprise the following steps:

1. Splitting the non-polarized pump beam into two, orthogonal linearly polarized beams.
2. Rotating the polarization of one beam such that the two beams polarizations will be parallel to each other.
3. Pumping an optical frequency converter, such as harmonics generator, sum/difference frequency generator, optical parametric oscillator and equivalents, with both beams.

In one embodiment of the invention, the method for frequency conversion of a non-polarized optical light beam may include jointly pumping one, type II phase matched frequency conversion process with two orthogonally polarized beams.

In one embodiment, a single combined beam may be generated in the converter. In another embodiment, two beams may be generated. In yet another embodiment, the polarization of one of the generated beams is rotated so as to be orthogonal to the polarization of the other beam, and the beams are joined together by a polarizer into one, non-polarized beam.

BRIEF DESCRIPTION OF THE DRAWINGS

The present invention is herein described, by way of example only, with reference to the accompanying figure, wherein.

DETAILED DESCRIPTION OF THE PREFERRED EMBODIMENT

Figure 1:
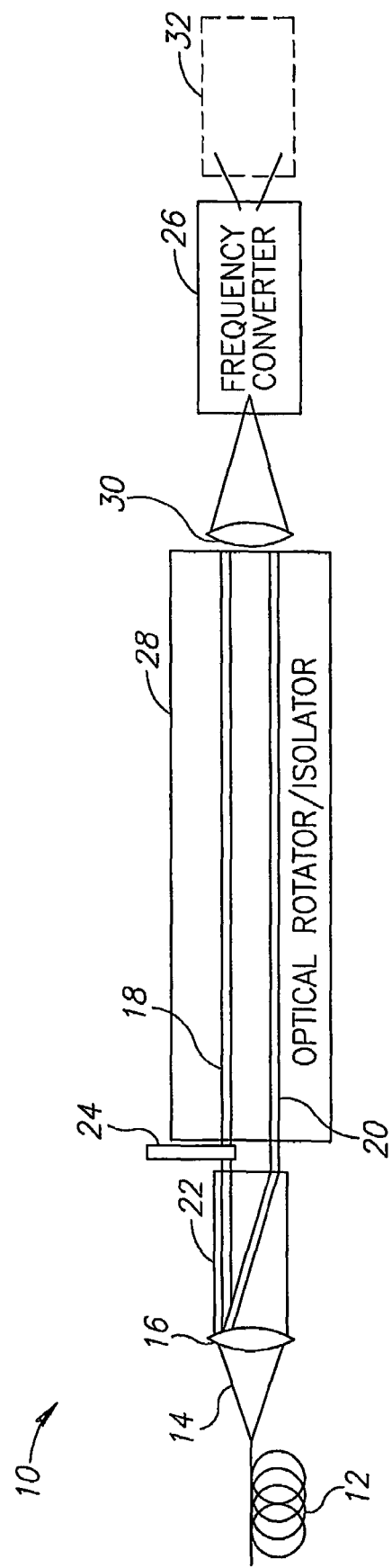
FIG. 1 is a simplified block diagram of an optical frequency converter, constructed and operative in accordance with an embodiment of the present invention.

Reference is now made to FIG. 1, which illustrates an optical frequency converter 10, constructed and operative in accordance with an embodiment of the present invention.

A pump laser 12, such as but not limited to, a fiber laser, may emit a non-polarized laser beam 14. The laser beam 14 may be collimated by a collimating lens 16 into a collimated beam. The collimated beam may be split into two linearly polarized beams 18 and 20, with orthogonal polarizations, by a beam splitter 22, such as but not limited to, a beam displacing polarizer. The polarization of one of the beams may be rotated 90° by beam forming optics 24, such as but not limited to, a half-lambda retarding waveplate, with the result that the polarizations of the two beams are parallel to each other.

Beams 18 and 20 may then pump (that is, enter) an optical frequency converter 26, such as but not limited to, a harmonics generator, sum/difference frequency generator, or optical parametric oscillator, type II phase matched frequency converter, for example. As another example, the optical frequency converter 26 may include a non-linear crystal placed within a cavity, wherein the common cavity is pumped by the polarized beams 18 and 20.

In some embodiments, such as a double pass pumped optical parametric oscillator, a large amount of laser light might be reflected from the frequency converter 26 into the pump laser 12, which could possibly interrupt the laser 12. In such a case, the collimated pump beams 18 and 20 may be transmitted through an optical isolator 28 in order to prevent this interruption. Both beams 18 and 20 may be focused together by a pump coupling lens 30 into the frequency converter 26. If the frequency converter 26 is an optical parametric oscillator, both beams 18 and 20 may pump the same oscillator cavity, generating one pair of signal-idler beams. It is noted that the beams may be focused together into one spot within the frequency converter 26 so as to generate one converted beam. As another option, the two generated polarized beams 18 and 20 may be combined into one beam by means of a polarization beam combiner 32.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. A method for frequency conversion of a non-polarized optical light beam, comprising:
   splitting a non-polarized optical light beam into two orthogonally polarized beams;
   forming said polarized beams and rotating the polarization of one of said polarized beams; and
   pumping an optical frequency converter with said polarized beams, wherein said optical frequency converter comprises a non-linear crystal placed within a common cavity, and the common cavity is pumped by said polarized beams.

2. The method according to claim 1 further comprising placing an optical isolator in the beam path such as to prevent reflection-returned light from entering into the pump laser.

3. The method according to claim 1, wherein both beams are focused together into one spot within the frequency converter so as to generate one converted beam.

4. The method according to claim 1, further comprising combining the two generated polarized beams into one beam by means of a polarization beam combiner.

5. Apparatus for frequency conversion of a non-polarized optical light beam, comprising:
   a beam splitter adapted to split a non-polarized optical light beam into two, orthogonally polarized beams;
   beam forming optics adapted to form said polarized beams and rotate the polarization of one of said polarized beams; and
   an optical frequency converter pumped with said polarized beams, wherein said optical frequency converter comprises a non-linear crystal placed within a common cavity, and the common cavity is pumped by said polarized beams.

6. Apparatus according to claim 5, wherein said beam splitter comprises a beam displacer polarizer.

7. Apparatus according to claim 5, wherein said beam forming optics comprises a half-lambda retarding wave plate, placed into one beam path such as to rotate its polarization by 90°.

* * * * *